Aug. 13, 1968     P. ANDREWS     3,396,810
SURFACE, MATERIAL AND HEALTH PROTECTIVE DEVICE
Original Filed June 17, 1963
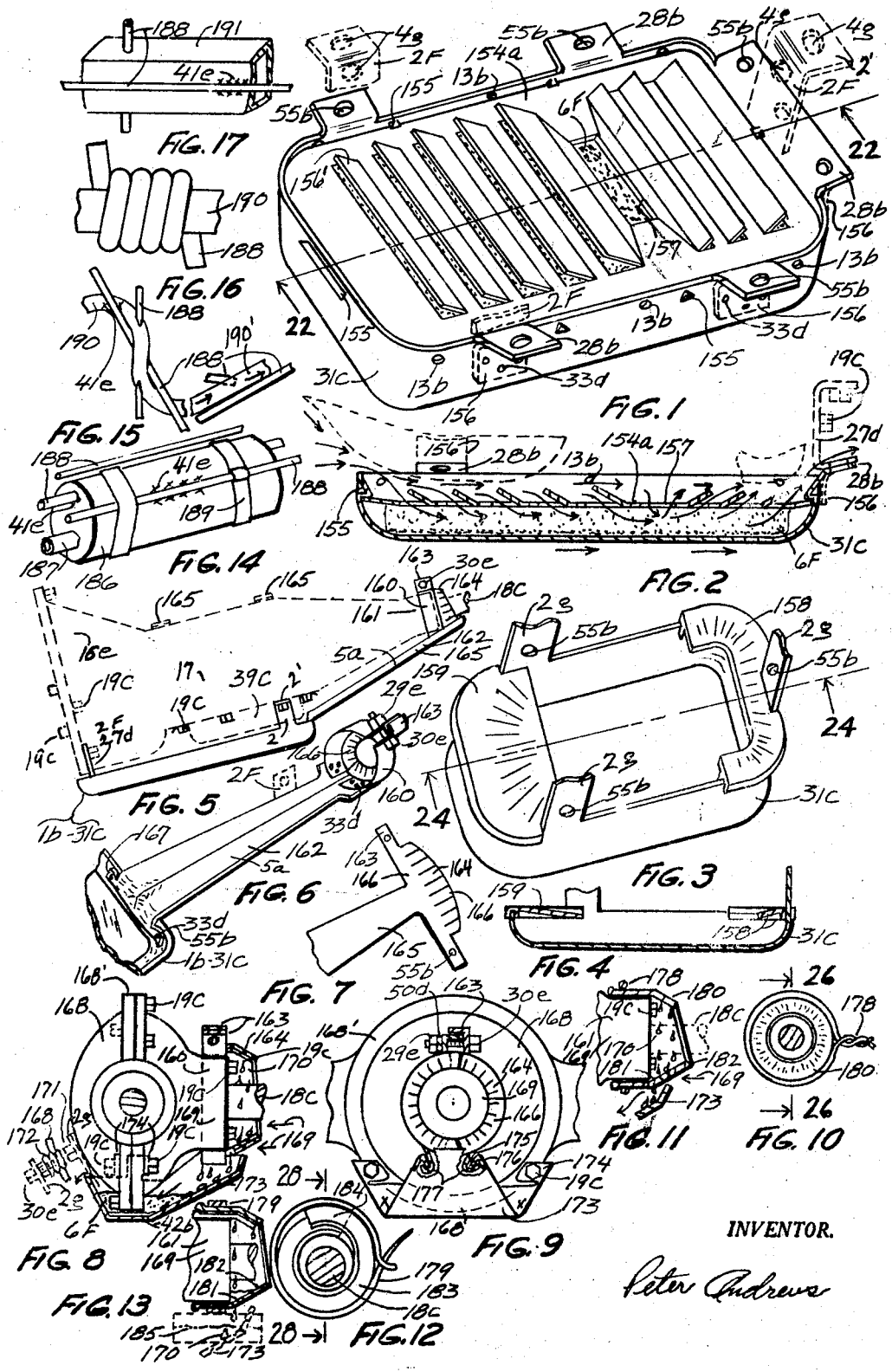
INVENTOR.
Peter Andrews United States Patent Office 3,396,810
Patented Aug. 13, 1968

3,396,810
SURFACE, MATERIAL AND HEALTH
PROTECTIVE DEVICE
Peter Andrews, 190 Gebhardt Road,
Penfield, N.Y. 14526
Original application June 17, 1963, Ser. No. 288,159.
Divided and this application Oct. 21, 1965, Ser. No. 508,625
16 Claims. (Cl. 180—69.1)

This is a division of application Ser. No. 288,159, filed June 17, 1963, and now abandoned and which 288,159 application is continued by the now pending C.I.P. Ser. No. 530,217 application filed Feb. 25, 1966.

This invention relates substantially to a surface, material and health protective device.

This device is used in operative association with motor vehicle to catch and retain the fluid or fluids, which leak or drip from, on or in said vehicle, to prevent the surface or material which is substantially around and under the leaking or dripping fluid from becoming a disgustful sight, polluted, slippery, contaminated or impaired by said fluid.

Drip pans, trampoline, shelf or hinged trap door and the like devices have previously been constructed to retain oil drippings under automobiles, trucks or busses.

None that I am aware of have attached or secured a collar-like device to a boat and the rest of the automotive vehicles or the like. None that I am aware of use a collar-like device for catching the dripping fluid or oil which is generally from the rear of the transmission (shaft seal) and the rear end shaft seal. This collar-like device retains the dripping fluid and, through centrifugal force of an exposed rotating shaft means, the thrown out or fluid therein and thereby prevents said thrown out fluid from virtually spraying the underside of the motor vehicle and the traveled vehicular surface below said vehicle when it is standing or in forward drive motion.

One prior art device captures the leaking fluid and then ejects it onto another portion of a traveled surface, which is just what should not be done and prevented from being done.

The term "automotive vehicle" will hereafter in this specification specifically represent motor vehicles.

This collar-like device generally is attached, secured, fixed, removably secured, releasably attached, or releasably locked, to, in, or on said vehicles before or after the leaking fluid starts to drip therein, thereon or therefrom.

The device may be, as desired, attached, removably secured, releasably welded, soldered, cemented, adhesively held, snapped, banded, clamped and the like to said vehicle.

This device is thereby securedly associated with or is in substantially secured combination with said vehicle and thereby is considered as being a part of said vehicle, regardless what phase said vehicles are in. The term "phase" is here used to designate the motor vehicles which herein are represented by four classes thereof.

The first class is any automotive vehicle which travels on the surface or material of a street, road, highway, floor, inside of garages, buildings, warehouses, factories, raceways, airport areas, and the like, having rubber or elastomer, synthetic or natural-tired wheels, which are inflated, semi-solid or solid. Some of these motor vehicles are automobiles, trucks, busses, tractor trucks, factory fork lift trucks, racing cars, tram trucks, trucksters, transport trucks and the like being any, three or more wheeled motor vehicles having said wheels or tires.

The second class of motor vehicle is watercraft.

The third class of motor vehicle is aircraft.

The fourth class of motor vehicle is the type which travels on two rails and another type that travels on a single rail which is supported by trestles.

The term "device" will in this specification be used to represent this collar-like "surface, material and health protective device."

This combination device is thereby secured under and to or in and to, said vehicles, which are in the previously disclosed first class thereof and which are in new or used condition; on display, in storage, and the like.

A portion of this device may also be secured to or only be under a cross member and the like.

Motor vehicles, new or used, which are being transported, may have the device removably secured thereunder.

This device could also be secured in and to a watercraft or under any fluid retaining tube, fitting or an element, mechanism, motor pump and the like, in any motor vehicle. This device or a main portion thereof is, thereby, under the fluid which is leaking or dripping from or being thrown out by an exposed rotating shaft means of said mechanism or component of said vehicle.

The device may also be secured on the inside of the cabin or fuselage of an aircraft when parked, in storage or in flight, which has a fluid dripping condition therein. The device would thereby protect the surface or material under and generally circumferentially around the leaking fluid from becoming unsightly, polluted, contaminated, or impaired. The device could also retain dripping water if necessary, which would also prevent an undesired condition in the fuselage of an aircraft or aircraft and watercraft combined.

The fourth class of the automotive vehicles is used here to designate a monorail train or car, which operates or travels on a rail which is supported and mounted on trestles. Another part of this class are locomotives having steam, internal combustion engines or motors, electric motors, batteries, generators, and the like or any combination thereof which are used in the motor or generator car.

This collar-like device can be disposable in whole or in part, as deemed desirable or necessary by the manufacturer, depending on the device, its structure, or its application.

A very important object of this invention or device is to prevent the previously disclosed surface or material which is under, on or in a motor vehicle, from becoming a disgustful sight, polluted, contaminated or impaired.

Yet another important object of this invention is to protect the surface or material under said vehicle, for example, that may be a road, street, highway, driveway, garage floor, toll areas, toll collecting station areas, bridge pavements, factory floors, factory and plant inner streets or roads, manufacturing plant floors and the like that would be polluted, contaminated, impaired or create a hazardous slippery surface for motor vehicular travel thereon.

A further object of this invention is to prevent the air from becoming polluted or contaminated by oxidizing the hydrocarbons from the retained fluid. If the fluid therein was allowed to leak or drip, forming a fluid mess or puddle or allowed to be spilled or dumped onto a hot sun heated surface and thereby be exposed to the sunlight, the emission of hydrocarbons would be prevalent therearound.

A still further object of this invention is to save money for the state, parking garage owners, cities, towns, federal government and the like by preventing the pollution, contamination, or impairment of the surfaces or material on thruways, bridges, highways, toll collecting areas, collecting stations, gasoline stations, garages, warehouses, storage areas, parking areas, streets, freeways, turnpikes, and the like which are being cleaned with surface improving machines, surface cleaning machines or cleaning with detergents, soaps, and the like. The state alone is presently paying thousands of dollars to clean the thruway areas and toll collecting areas and thereby millions of dollars is saved for all concerned by use of this device.

Another principal object of this invention is to provide a device, which is secured to the underside of said motor vehicles (the first class thereof) which would thereby prevent the surface of streets, roads, highways, thruways, toll areas, collecting stations, bridge, vehicle traveled surface, turnpikes, freeways, and the like, from becoming contaminated by the leaking fluid, which leaks past gasketed or sealed joints or shaft seals whereby said fluid drippings are contaminating, polluting, and impairing the said traveled surfaces. The said fluid is creating a slippery dangerous surface onto which vehicular traveling is becoming more and more crowded or congested. The more crowded or congested the said traveled surfaces are, then the more damaging the fluid drippings are going to be, and also become a very objectional condition. The motor vehicular traveling conditions are thereby going to be also compounded and the appearance of the traveled surfaces are still further going to be objectionable. The following safety hazard also is compounded when moisture, dew, and especially rain or surface water will, when added to the fluid which has dripped on the motor vehicular, highway and the like, used slippery surface, raise or lifts a portion of the said fluid drippings onto its surface and thereby tends to spread or float the said fluid drippings even more so, especially from the center portion of the traveled surfaces, where the fluid dripping contamination and the like, is black from the dripped slimy, slippery fluid. The said moisture, dew or water thereby, actually spreads the fluid or oil slick onto the somewhat cleaner portion of the motor vehicular traveled surfaces, and thereby creates an even more dangerous surface to travel thereon.

Still another principal object of this invention is to provide a device which is secured to the underside of racing cars to prevent fluid, which is or which is apt to leak therefrom and onto the surface of a testing course or the surface of a surfaced race car track. The dripping fluid would create a slippery spot, streak or area which would make it very dangerous to test, try out, time trials or to race thereon. The device could be secured to the underside of the racing automobile vehicle, before the race to retain or catch the dripping fluid if it should start to leak therefrom while the racer was in action on the speedway or track. This device even if secured to the underside of a racing motor vehicle when there is a showing of leaking fluid would thereby eliminate said dangerous slippery surface and also will prevent the racing car from being excluded from the race, which is one of the rules for the 500 mile Memorial Day race at Indianapolis. Fluid dripped spots would also be prevented from being unsightly on the surface of the race pits.

Still another further important object of this invention is to create or bring it to the attention of motor vehicle (the first class thereof) manufacturers, and city and state and federal authorities, that this invention is necessary, useful, needed, and essential so that the device could become standard equipment, auxiliary equipment, optional equipment, optional "extra," or an accessory thereof. Adapting brackets, holes, flanges, or a means to secure the device to or under the motor vehicle would be at least at the discretion of the motor vehicle manufacturer.

The very last object of this invention is to produce a fluid retaining device of the character described which may be produced and used at a minimum of expense and yet assure the highest degree of surface or material sanitation, maintenance and attractiveness that is desired upon painted surfaces, traffic lines, parking lines and the like areas used by said motor vehicles. The minimum of expense is also still reduced, whereby, accessible bolt means, accessible bore means, accessible securing, accessible attaching, attaching or sliding means or any other accessible means which is provided on the motor vehicle for the sole purpose of permanently securing, removably securing, or removably attaching said device to said vehicle, by a motor vehicle manufacture or an individual. Additional cost for said device is saved, by use of proximate said means also, of said vehicle.

A clear support of terms and phrases used in the claims for or antecedent basis are to also be found in the description of drawing FIGURES from 1 to 17 to the appended drawing and are to be considered as a portion of the remainder of this specification and which description also contains descriptive portions to be considered as being contained herein the latter detailed specification description.

In the drawing:

FIGURE 1 is an isometric view of a louvered top or cover which is contained therein a pan or receptacle.

FIGURE 2 is a cross section along line 22—22 of FIG. 1.

FIGURE 3 is an isometric view of a surface or material protective device which shows two types of end, bezel-like, members.

FIGURE 4 is a cross section along line 24—24 of FIG. 3.

FIGURE 5 is a side view of one embodiment of this collar-like surface or material protective device.

FIGURE 6 is an isometric view of a V-shaped trough having a collar-like end.

FIGURE 7 is a portion of a trough and all of an integral and split end portion of a fan-like collar in which both are in a flat developed view.

FIGURE 8 is a side view of a collar-like surface or material protective device, which is removably secured under a differential housing.

FIGURE 9 is a front view of FIG. 8 to show the construction of the collar and fluid retaining device thereunder.

FIGURE 10 is a front view of a boot or sleeve.

FIGURE 11 is a cross-section along line 26—26 of FIG. 10.

FIGURE 12 is a front view of a split sleeve, collar or band that has a strapping securing means therearound. This construction facilitates the installation of the said sleeve or band on the hub or housing end by not having to dismantle a portion of a vehicle to install the said device over the said hub or housing end. The view also shows a strapping means for securing said band or sleeve to said hub or end, but clamping, banding, and the like can also be used.

FIGURE 13 is a cross section along line 28—28 of FIGURE 12, showing also the fluid exit hole or slot in the bottom of said band or hub and also shows a small box-like pan or receptacle, in dashed lines, which can very easily be adapted under the shaft hub or housing end, along with or integrally with a collar, band, sleeve, and the like if desirable or deemed necessary. The bottom of the special drive assemblies, transaxle, carrier, tractor transmission and final drive, two-speed transmission and axle assembly, differential and the like would thereby not have anything thereunder if the small receptacle were used and is preferred in some instances or situations.

FIGURE 14 is an isometric view of a muffler, of an exhaust system, showing a projecting small tubing, which goes through the muffler or tubing along the outside of the muffler.

FIGURE 15 is a view showing tubing, which is through a portion of a pipe of an exhaust system.

FIGURE 16 shows a view of a tubing, which is coiled mechanically, manually and the like, around a portion of a pipe of an exhaust system.

FIGURE 17 is a view of a separate tubing means and an exhaust manifold.

The detailed portion and description of the drawings and specification will now be disclosed:

FIGURES 1 through 17 are disclosed herefrom, whereby FIGURE 1 shows the receptacle 31, hanger 27 securing bracket ear 28, which have an opening 55 therein for receiving a bolt 30 as shown in FIGURE 21 in the parent application 288,159 having drawing sheet No. 3 and which bracket ear 28 could also be integrally and completely surrounding on the perimeter of the receptacle 31, if desired or deemed necessary. The said ear 28 may also be a separate member or material as is shown by the bracket means 156 which, if desired, is permanently secured, for example, by spot welding 33 as shown. The view shows a cover 154 which has a louvered 156' structure for directing the draughting flow of air thereinto and sucking the air out as shown by the air arrows in FIGURE 2. Hangers 2 having ends 2' thereon or plain ended hangers 2 can also be used if desired or deemed necessary. Hangers 2 are shown in dashed-line outline. The material 6 is also shown therein and which is preferred to be an air permeable and fluid permeable, open cell foam, fibrous, curly hair bonded material, also glass wool, man-made fiber which is loose, in batting form, or which is resin or elastomer (oil resistant) bonded together. Openings 13 are made for receiving a wire means 12, shown in FIGURE 1 of a divisional No. 508,624 application having drawing Sheet 1, if used, are for retaining the cover 154 in the receptacle 31. The embossed, inwardly formed protrusions 155 are for snapping the cover 154 thereover, thereby the cover 154 is retained in the receptacle 31 and the wire 12 may not be needed. Tabs or fingers 11, 86 and the like shown in the 508,624 divisional application, and 532,831 application having drawing Sheet No. 6 may also be used if desired when, for example, the receptacle 31 also be used in the bezel-like receptacles shown in FIGURES 1 through 10 of the copending divisional 532,831 application having drawing Sheet No. 7 if desired or deemed necessary and the bezels 141, 115, and washer-bezels 151, 152, 154 thereof, said divisional would thereby retain the cover 154 in the disclosed receptacles. The cover 154 may also be sealed in the receptacle seam, as in washers 151, 152, 154 and as shown in FIGURES 6, 7, 8 and the like in said divisional.

FIGURE 2 shows the flow of draughting air which is arid, dry or moisture laden and the like. The arrows show the path which is taken by the flow of draughting air and just how the louvers 156' deflect the air and when a draughting air passes the reversed louvers, a suction action is created, on the air, in the receptacle 31 and material 6 as is shown. The opening 157 is also for the leaking fluid entry and should be located under the bell housing 16, if desired. The opening 157 may also be eliminated because the dripped fluid would enter into the receptacle 31, through the openings made by the louvers 156', after they were stamped or formed out. If the cover is molded, then the openings are automatically made therein. The louvers 156 can also have integral ends thereon if desired or deemed necessary, as regular louvers which are formed in sheet metal and the like. The integral, rounding, ends would strengthen the louvers 156 and thereby prevent air-flutter thereof and which air-flutter is created by the forced draughting flow of air when the motor vehicle is in forward drive motion. Hangers 27 and accessible motor vehicle bolt means 19 are shown in dashed-line outline as to how they may be secured to the hanger 27 or a plain ended hanger 27.

FIGURE 3 shows, a device having a receptacle 31, hangers 2, openings 55 which are used and receive bolt means 30 for removably adapting the welded hanger 46 as shown in the drawing of the copending C.I.P. application Ser. No. 530,217, or a bracket or angle member 48 or 49 as desired or deemed necessary and shown in said 530,217 application. The view shows a partial bezel 158 and a still larger partial bezel 159. The bezels 158 and 159 have a channel-like groove therein, that is used, as shown in FIGURE 4, whereby it is sealed, on the upper edge of the receptacle 31, against fluid leakage past that grooved seam or joint. These bezels are especially made for use with motor vehicles which at times will climb or descend very steep grades for example as in the mountains and the like. The large bezel 159 will also retain the most retained fluid, which is in the receptacle 31, even when the first vehicle is stopped very abruptly and even when it was previously traveling at a high speed. This is especially true if water has entered the receptacle 31 and thereby has thinned out the consistency of the retained fluid to a slushing thin mixture. With the water in the receptacle 31, it will tend to lift the retained fluid on its surface, whereby it can be readily seen what will happen when said vehicle is without even a partial bezel, of at least some sort. The bezels 158 and 159 are also dished downwardly as shown to clear the crankcase oil pan 15 and the like and whereby any fluid which leaks on the bezel surface will tend to at least flow into the receptacle 31. The bezels 158 and 159 may also have a rib 131 on its top surface and be curvedly shaped to miss the hangers 2 if so desired or deemed necessary. The bezels 158 and 158 may also be straight across if so desired or deemed necessary, but the shown dished down design is preferred. The right and left side, bezel-like members, can be as shown or in identical pairs or any combination desired or deemed necessary.

FIGURE 5 shows the device removably adapted to the first vehicle with accessible bolt means 19. In FIGURE 5 the device plain ended rear hangers 2 and the forward hangers 27 are removably secured to the bell housing 16, with bell housing 16 accessible and available bolts 19 and the other two hangers 2 with hanger end 2' are removably secured to the transmission oil pan 39 flange, with accessible said bolts 19. The bell housing bolts 19 are also inserted, from the opposite of that shown, whereby the hangers 2 and/or 27 may be removably secured to the bell housing 16 from that particular side, if so desired or deemed necessary.

FIGURE 5 also shows the ear 162 or 165 and the transmission extension end 161, shaft 18, fluid throwout or spray retaining collar device 160 which is removably secured on and over the transmission extension end 161. FIGURE 6 shows an isometric view of the rear end of receptacle 1 and /or 31 with one end of the V-shaped trough 162 overhanging the rear end of the receptacle. The portion of the V-shaped trough that is in the receptacle 1 and/or 31 is preferred to be permanently secured against the rear, upstanding, inside wall portion, see FIG. 6, of the receptacle 1 and/or 31. The spot welding marks 33 are shown but also an opening 55 for inserting a bolt 30 means through and into a threaded nut 29 may also be considered especially if the end of the trough 169 is to be removably secured to the rear side of receptacle 1 and/or 31. The tabs or ears 167 facilitate spot welding and removably adapting thereof to the disclosed rear side portion.

This device is also shown in FIG. 5, in one of its embodiments having the trough 162 which is an integral member at the rear of the lower receptacle portion of this device. The trough 162 is shown reaching up and under the transmission extension end 161 and having a generally circular or flanged collar-like member 160 secured to the end of said trough. The collar-like member may also be an integral part or end of said trough 162 or 165 as the case may be. The collar-like member 160 or 165 is secured clampingly and surrounds and also overhangs beyond the end of extension end 161. The collar-like member 160 captures and retains fluid which drips from the extension end 161 and/or retains fluid which is thrown out, ejected or sprayed out through the centrifugal force of the rotating shaft 18 means when the motor vehicle, for example, the first class thereof, is in a forward drive motion. The captured or retained fluid then generally flows out of the bottom portion of said collar-like member 160, into the trough 162 and then into the receptacle 1 portion of this device, generally as shown in FIGS. 8 and 11. The trough 162 end may also be beyond the end of the collar-like member 160 if so desired or deemed necessary. Of course, if the trough 165 construction as shown in FIG. 6 is used then the collar-like member 166 would be the upper end of this device.

FIGURE 6 was also partially disclosed hereabove and shows th eV-shaped trough 162 member, which is made of any material which was disclosed for receptacle 1 and/or 31. The view shows a hanger 2 in dashed-line outline, and fluid thrown out or throw out retaining collar 160, which is here preferred to be made in two sections, and which, for example, are permanently secured, by spot welding 33, to each inside portion of the V-shaped trough 162. The collar 160 halves could also be cemented, heat sealed, riveted, and the like, if the trough 162 and collar 160 are made of a plastic material and not out of metal material. The collar 160 may also be a solid one piece material if so desired or deemed necessary, but with a split end portion 166 integrally thereon. In FIGURE 5 it will be noted that the V-shaped trough extends up to or past the end of the slit and tapered 166 end of the collar 160. This is for retaining the dripping fluid which may leak past the slot-like end or through the slits (not numbered) in end 166 and which fluid would be retained in the trough 162, which is under a fluid dripping point. FIGURE 6 also shows the bolt 30, nut 29 and overlapping and clasping portion 163. Shown in dashed line outline is the trough securing ear or tab 2, if desired or deemed necessary, whereby the collar-like member 160 can just circle around the hub end of extension 161 with no physical contact with said hub. The collar halves are of a solid walled nature or have a portion of their wall split into a fan-like slat arrangement to permit easy forming of the collar-like member into a generally circular or non-circular member, and thereby conveniently conforming to practically any shape around which the solid portion of the collar-like member 160 is banded, strapped, welded, clamped, cemented, secured or be entirely free as was previously disclosed. Various perforated materials could also be used for the collar-like member 160 or 166 as desired or deemed necessary. The hanger 2, in dashed-line outline, is used as desired when the trough or ear 5 is used, whereby the ear 5 extends under the collar 160 and is not secured to said collar as previously disclosed and is generally shown in FIG. 8, for example.

FIGURE 7 is a flat developed layout view of one piece of sheet material 165 which is oil resistant and fluid impermeable and has a multiple, slit end 166 portion. The integral trough end 166 having slat-like members 164 are constructed so that the generally circular shape of the collar-like member 160, shown in FIGS. 5 or 6 could be formed manually around the, for example, transmission end 161 and the like, which have contained therein a rotating shaft means, which is exposed and projects or protrudes therefrom. The shaft means having a fluid seal around one portion thereof to prevent fluid from leaking out of the transmission end 161 and the like. The material 165 is later shaped into a generally V-shaped trough, as is material 162. The sheet portion 166', of the material 165 is formed to conform with the shape of the transmission extension end 161 and the slat-like fingers, 164 in end 166 are substantially created by having the slits through the end 166. The slat-like fingers are thereby overlappingly tapered toward the transmission and towards the shaft 18 (shown in FIGURE 5). The ends 163 having a bolt 30 receiving opening 55, are preferred to be formed as shown in FIGURE 6, with bolt 30 therethrough and nut 29 threaded on the bolt 30. The end 166 could also be crimped and not slit as shown, whereby it would be necessary to flex open the collar 160 to an open position for threading the shaft 18 therethrough so that the collar 160 may be conveniently removably secured over the transmission end 161.

FIGURE 8 shows another embodiment of the surface, material and health protective device which is removably secured under the differential housing 168 of a motor vehicle, for substantially retaining therein the fluid which leaks out, for example, of the differential and drips into said device. This particular device is preferred to be made from a material which is oil resistant and fluid impermeable and which device has a receptacle 173 and a dripping fluid catching collar 160. Fluid which leaks past the drive shaft 18 end of the differential 168 or the seam between the differential housing 168 halves or out of the differential fluid drain plug or differential fluid filler plug 172 and the like, all of which are also to be considered as being on truck driving axle carriers and the like. FIGURE 8 shows the accessible bolts 19 which retain a fluid seal and drive shaft bearing which are housed in the 169 end of the differential housing 168. The bolt 19 can thereby be utilized for removably securing the collar 160 to the housing end 169. The view shows the leaking fluid 170 which is thrown out or sprayed by centrifugal force in a substantially pinwheel fashion as the drive shaft 18 is swiftly rotating whenever the first class motor vehicle is in a forward drive motion and especially when it is traveling at a high speed. The fluid, as shown, has leaked past the shaft 8 seal and was thrown out against the inside portion of the fluid retaining collar 160. The view shows the fluid 170 as it, for example, drips down and into the receptacle 173 therebelow. The tapered portion 166 of the collar 160 is to prevent any fluid which may drip from the top, short portion, of the taper 166 and into the longer extended portion thereunder, as shown. The receptacle 73 bottom wall portion is shown in spaced relation to the bottom portion of the differential housing 168 flange and extends upwardly at an angle therefrom and is substantially tangent and in spaced relation to the rear curved portion of the differential housing 168. The differential housing flange accessible bolt 19 means are used for removably securing the configurated angular shaped receptacle 173. The accessible flange bolts 19 are shown on both sides, in solid and in dashed-line outline and the ear 174 is also shown in solid and dashed-line outline, opposite each other, so that the ear 174 may be removably secured to whatever side has the bolt 19 head. If a nut is on an accessible bolt 19 threaded portion then the ear 174 may be secured under the side desired or deemed necessary. Some of the housing bolts are threaded into and through the other flange, in which case the original accessible bolt 19 is removed and longer bolt 19 is inserted, whereby the ear 174 is slipped thereover since ear 174 has an opening therein for receiving the bolt 19 body. The extended and threaded portion of the new bolt 19 and a lock washer 50 and nut 29 is used for removably securing the ears 174 to the housing 168 flange. The latter arrangement allows the ears 174 to be removed from the housing 168 without disturbing or loosening the bolt 19 and thereby the differential flange joint is not disturbed. This arrangement is especially good when a gasket material is between the differential flanges. The inside bottom wall portion of the receptacle 173 may also be against the circular or curved bottom portion of the housing 168 flanges, if so desired, and thereby a draughting flow of air will still go over and against a portion of the retained fluid 42 and out and over the rear angled side of the receptacle 173, as shown by the air flow arrows 169. FIGURE 8 also shows a material 6 which may be any place therein, between the receptacle 173 and housing 168 or flange 168'. The material 6 is, for example, an air filter material as previously disclosed in FIGURE 2 and the like but a small or shallow amount of earth and the like may also be contained in the receptacle 173. A catalyst for the said retained fluid may also be retained in the receptacle 173, as was disclosed previously in this specification. Hydrocarbon consuming bacteria can also be retained in the receptacle 173 if desired or deemed necessary. The material 6 may also be completely eliminated, if desired or deemed necessary. FIGURE 8 further also shows a means for removably securing the rear of the receptacle 173 to or on the rear portion of housing 168. The view shows a special, shouldered, gasketed differential housing 168, fluid filler plug 171, which is generally removed when the fluid level in the housing 168 is to be checked. The standard threaded pipe plug 172 is thereby replaced with a special bolt 171 which is threaded into the same or altered threaded opening therein, to seal the fluid in the housing 168. A gasket material may also be placed between the housing 168 and the hanger 2 which is integrally on the rear of the receptacle 173. The head of the bolt 171 is then forced against the hanger 2 portion and thereby the fluid is gasket sealed from leaking out and at the same time the hanger 2 is removably secured to the housing 168. The FIGURE 8 also shows the standard pipe plug 172 which is generally used in the housing 168 form as a fluid filler or drain plug. The plug 172 is shown with an altered opening therein. The disclosed threaded hole may also have a heli-coil insert placed therein, if desired, for thread strength and wearability. The pipe plug 172 may also be made of a steel material which may be hardened or case hardened, whereby the plug 172 is here simulated in appearance only, but having the threaded opening therein that is in the direction of its axis, but is desired to be not entirely therethrough. The view shows plug 172 with a hanger 2 removably secured thereto by a bolt or screw 30. The plug 172 is secured into the housing 168 in the usual way and when tight, the hanger is removably secured thereto, with the bolt means 30. Thereby, the plug 172 is not loosened if the hanger 2 must be removed or the like. This arrangement substantially uses what securing means is also accessible and also available. The latter method is generally used if the housing 168 is flange welded and thereby there are no accessible housing 168 flange bolts 19 which may be accessible or available. In the former arrangement and construction, wherein the ears 174 are used, the pipe plug 172 could be removed for fluid level inspection and fluid insertion through the exposed pipe hole opening without disturbing the receptacle 173 or ears 174.

Shown is a fluid throw out or spray retaining collar-like member 164 having an inwardly tapered front whereby fluid drippings will drip into the inside of said member 164 and into the fluid retaining receptacle portion 173 of the device below, even when the motor vehicle is out of level. The collar-like member 164 can also be a separate part, which is clamped around the hub or end of the extension housing 169 and fluid would drip there from and into receptacle 173 which is separately suspended under the member 164. The collar-like member 164 can also be front bolt means secured because some hubs have face bolt securing means thereon for a fluid seal or a bearing and the like retaining means.

FIGURE 9 shows the collar 160 as it is clamped by the bolt 30 which is threaded into the nut 29 which has a lock washer 50 thereunder. The construction of the upper portion 163 is generally known in the art and various other hose or tubing clamping means may also be used, if desired. The collar 160 is shown in two parts and each lower portion thereof is hook 177 shaped, whereby a portion of the sides, of the receptacle 173, are also hook 176 shaped and the two sets of hooks are engaged, as shown, for hookingly securing the forward portion of the receptacle 173 to the lower portion of the collar 160 halves. The collar 160 halves, have an opening which is created by the hook 177 material, but the collar may be made of a solid sheet of metal material or made from a plastic and the like material. The receptacle 173 material may also be a catalyst for the retained fluid if so desired or deemed necessary. The slat-like fingers 164 may also be in the tapered portion 166 if so desired. The hooking and joining of the collar 160 and receptacle 173 do not necessarily have to be such construction because if the ears 174 and the like are used, then the forward portion of the receptacle 173 could be self-supporting under the collar 160, more or less as is shown in FIGURE 8. The FIGURE 9 also shows in a partial, circular dashed-line of how the flange of housing 168 would be located when it is against the receptacle 173 inside bottom wall portion. The "x" marked free areas are for the draughting flow of air therethrough.

The collar 160 as shown in two pieces also facilitates the installation thereof onto the housing hubs or ends, thereby having nothing to dismantle from the motor vehicle. The collar-like member 164 could also be in one piece, whereby it would be bent open, if necessary at the bottom portion of the tapered wall, to be threaded or forked over the shaft and then rebent to be secured to or over the extension end 161 or 168, as desired.

FIGURES 10 and 11 show a one piece, leaking fluid, and/or a fluid thrown out or throw out capturing sleeve or collar 180 which is on the transmission extension end 161 or housing 168, end 169. The collar 180 is oil resistant but not necessarily fluid impermeable, but a fluid impermeable one is preferred. The view shows the collar 180 as having a tapered snout and the wire 178 means for securing the collar 180 on the 161 or 169 members. Strapping, clamping, banding, adhesive means and the like can be used for securing the collar thereon. If an elastomer or similar material is used, the collar may be stretched over the 161 or 169 members and thereby no other but a resilient means must be generally used for retaining the collar 160 thereon. The view shows the receptacle 173 under the collar 180 for retaining the dripped in fluid therein, if so desired. The collar 180 could retain the dripped in fluid therein only, for example, as in FIGURE 10 or an opening would have to be in a bottom portion of collar 180 as shown and where the fluid 170 is leaking or dripping out and into the receptacle 173 or in a small attached receptacle 185, as is generally shown in FIGURE 13.

Of course the collar-like member 180 may be in one piece as shown and secured to or over the extension end 161 or 169 when the motor vehicle is being manufactured, assembled and the like.

Flow of generated air into the device and over the retained fluid therein will increase the rate of oxidation and thickening of said fluid. Catalyst, bacteria soil cultures having naturally occurring catalyst or enzymes, being hydrocarbon oxidizing bacteria, soil or earth may also be retained in the receptacle portion of this device, if desired. The device may be constructed from a material which is itself a catalyst means for the dripping fluid.

FIGURES 12 and 13 show a split, tapered, snouted collar 184 with a banding 179 means therearound. The split, overlapping, collar 184 permits a person to thread the collar 183 over the shaft 18 and over and onto the extension end 161 or housing 168, end 169, and without dismantling any portion of the motor vehicle. The small receptacle 185 may also have a curved bottom wall, a curved forward wall and end walls so that the receptacle 185 would at least partially conform to the curved portion of the housing 168, and especially when the collar 160 and receptacle 185 are banded, strapped, wired, and the like. Thereby generally all the disclosed parts would fit snugly to each other, if desired or deemed necessary. The receptacle 185 should not, preferably, have its bottom portion below the curved bottom portion 168' of the differential housing 168, when it is checked in a level position. It will be noted that the device shown in FIGURES 8 and 13 is not down below the bottom portion of the housing 168, flange 168'. The receptacle 185 and collar 183 may be made of any desired material disclosed for making receptacle 31 and the collar 183. The receptacle 185 and collar 183 may also be made from any rubber, elastomer, synthetic elastomer and the like material, that collar 180 is also preferred to be made of, whereby the collar is at least substantially oil resistant. Metal foil may also be used for collar 183, if desired or deemed necessary, because it is fluid resistant and fluid impermeable and is readily made by hand to conform to generally any desired shape especially if it is made from aluminum, copper and the like soft workable metal. The tapered portion 184 could be crimped all around, by finger or hand tool manipulation, if necessary. The strap 179 is a plastic strapping material which has an opening in one end and a plain or a side serrated or barbed tongue. If the collar 183, for example, is made of a nylon material and the like, which is oil resistant but is slightly affected by water, which may eventually pass through its thin walls, then it is to be considered in this specification as fluid impermeable for it is not affected by a petroleum oil and the like, which is a very important factor for this invention.

Material 6 may also be earth, diatomaceous earth, sand, alluvial soil or earth, alluvium, marine mud, fuller's earth, and the like being retained in the receptacle portion of this device as desired.

Ninety percent of the urban Americans live in localities with polluted air, but only half of all these people are served by local air pollution control programs. It is unmistakably clear that air pollution is associated with important respiratory diseases, such as lung cancer, emphysema, chronic bronchitis, and asthma, but progress or no program is effective if not backed by the public, whereby this Surface, Material and Health Protective Device is needed as was disclosed in the objects in this specification.

When hydrocarbons, oxides of nitrogen and the like are emitted from the leaked fluid which is on a hot, sun heated surface, or is exposed to the hot sunlight, a photochemical reaction produces irritants and haze. When these by-products are retained in an area by climatic conditions or topographical barriers, the concentration of irritants can produce severe discomfort. The Los Angeles basin has all the necessary ingredients to produce such conditions about 100 days per year.

In this time period of ever increasing vehicular drive and high speed traveling, whereby an ever increasing amount of vehicles are estimated (101,000,000) to be on the highways, thruways, freeways, turnpikes, streets, roads and the like, by 1972. This is an indicator to provide safer, cleaner and uncontaminated surface on which all persons in a motor vehicle must travel and this is a basis for this very needed invention.

While several embodiments of this invention has been disclosed, it is understood that the inventive idea may be carried out in a number of ways. This invention is therefore, not limited to the precise details described but it is intended to cover all variation and modifications falling within the scope of the appended claims. Those skilled in the art who have my disclosure before them will be able to make modifications and variations therein without departing from the scope of the invention.

The foregoing description and the drawing are given merely to explain and illustrate the invention and are not to be limited thereto, except insofar as the appended claims are so limited.

Having thus described my invention, I claim:

1. A surface, material and health protective device used in operative association with a motor vehicle having accessible bolt securing means comprising: a collar-like member having means for securing at least one portion of said member to a fluid shaft seal containing gear housing portion of and under said vehicle, said member having at least one portion extending substantially around a shaft means and beyond the end of said housing portion having lubricating fluid inside, said housing portion having said shaft means protruding out of and beyond said housing portion, said collar-like member is so constructed and arranged and secured to said housing portion that when said shaft means rotates, the fluid which leaks past said seal is thereby virtually thrown out in substantially pin wheel fashion and is substantially captured and retained in said collar-like extended portion and when said shaft means is not rotating, the dripping fluid from said housing portion is also substantially captured and retained in said extended portion.

2. The device according to claim 1 in which said member having at least one forward converging portion over said shaft means and at least one portion of said member has a means to removably secure said portion around an extended end portion of said housing portion.

3. The device according to claim 1 in which said member is removably secured and is fluid impermeable and is made of a manually formable material.

4. The device according to claim 3 in which said forming operation is aided by the use of at least one tool means.

5. The device according to claim 1 in which said member is removably secured to said housing portion and is made from an oil resistant elastomer material.

6. The device according to claim 1 in which said member is removably secured to said housing portion and is made of an oil resistant thermoplastic material.

7. The device according to claim 1 in which said member is removably secured to said housing portion and is made of an oil resistant thermosetting plastic material.

8. The device according to claim 1 in which said member is removably secured to said housing portion and is made from an oil resistant plastic material having reinforcing means therein.

9. The device according to claim 1 in which said member is removably secured to said housing portion and is made of an oil resistant plastic material having a filler material means therein.

10. The device according to claim 1 in which said member has throughout its length at least one split wall portion and a removable securing means which when tightened draws said wall portions together on and substantially around a shaft and fluid seal extension of said housing portion, and said device is so constructed and arranged that it may readily be threaded over said shaft and onto said extension of said housing without disassembling any portion of said motor vehicle.

11. The device according to claim 10 in which said member has its lower portion formed into an integral trough-like extension which is substantially in the rear open ended portion of said member, said trough-like extension having its other end secured by a means to an open topped fluid impermeable and fluid retaining receptacle having a bottom wall and integral upstanding surrounding side wall, and at least one portion of said wall having at least one upwardly extending integral hanger means being removably secured to said vehicle by at least one said bolt securing means that is inserted through at least one opening in said hanger means, said device is so constructed and arranged that fluid which leaks past said shaft seal is later captured by at least one portion of said member and flows therefrom and generally into said extension and said receptacle.

12. The device according to claim 11 in which said member has overlapping seats is at least one of its end portions, and said member is so constructed and arranged that it may readily be formed into a forwardly tapered overlapping slat-like structure.

13. The device according to claim 11 in which said member has its lower portion hookingly secured to a corresponding hooking portion of a fluid impermeable receptacle, said receptacle is substantially cup-shaped to receive therein at least one portion of the underside portion of the motor vehicle's differential housing, said cup-shaped receptacle having at least one portion thereof removably secured to the differential housing with at least one said accessible bolt means, said member having an opening through its lower rear portion through which said captured fluid later flows and substantially drips into said receptacle, said member and receptable are so constructed and arranged that said captured fluid is substantially retained in at least one portion thereof even when said vehicle is in a generally out of level position.

14. The device according to claim 11 in which at least one upper side wall portion of an open topped fluid impermeable receptacle is permanently secured by a means to a lower portion of said member, said receptacle is integrally constructed into a generally cup-shaped form, said cup-shaped receptacle receives therein at least one portion of the underside portion of said vehicle's differential housing, said cup-shaped receptacle having at least one portion thereof removably secured to the differential housing by using at least one said accessible bolt securing means.

15. The device according to claim 14 in which at least one wall portion of said receptacle has an opening through which an accessible differential drain plug means is inserted for removably securing said portion of said receptacle to said housing.

16. The device according to claim 1 in which an open topped integrally walled fluid impermeable receptacle is permantly secured to the lower portion of said member, said receptacle is located substantially in front of a curving portion of a differential housing, said member captures said fluid which later flows through an opening in the bottom of said member and into said receptacle.

References Cited

UNITED STATES PATENTS

| | | | |
|---|---|---|---|
| 1,182,378 | 5/1916 | Jewell | 180—69.1 |
| 1,444,310 | 2/1923 | Fishburn | 180—69.1 |
| 2,783,848 | 3/1957 | Beskid | 180—69.1 |
| 2,931,453 | 4/1960 | Inglese | 180—69.1 |

BENJAMIN HERSH, *Primary Examiner.*

MILTON L. SMITH, *Assistant Examiner.*